(12) United States Patent
McCann et al.

(10) Patent No.: US 9,858,526 B2
(45) Date of Patent: Jan. 2, 2018

(54) METHOD AND SYSTEM USING ASSOCIATION RULES TO FORM CUSTOM LISTS OF COOKIES

(71) Applicant: EXELATE, New York, NY (US)

(72) Inventors: Patrick McCann, Herndon, VA (US); Matthew Fornari, New York, NY (US); Kevin Lyons, New York, NY (US)

(73) Assignee: EXELATE, INC., New York, NY (US)

( * ) Notice: Subject to any disclaimer, the term of this patent is extended or adjusted under 35 U.S.C. 154(b) by 1343 days.

(21) Appl. No.: 13/782,930

(22) Filed: Mar. 1, 2013

(65) Prior Publication Data

US 2014/0250044 A1  Sep. 4, 2014

(51) Int. Cl.
*G06F 17/00* (2006.01)
*G06N 5/02* (2006.01)

(52) U.S. Cl.
CPC ..................................... *G06N 5/02* (2013.01)

(58) Field of Classification Search
CPC  G06N 3/08; G06N 3/02; G06N 3/049; G06N 3/04; G06N 3/063
USPC .......................................................... 706/47
See application file for complete search history.

(56) References Cited

U.S. PATENT DOCUMENTS

| | | | |
|---|---|---|---|
| 5,848,396 A | 12/1998 | Gerace | |
| 5,948,061 A | 9/1999 | Merriman et al. | |
| 5,991,735 A | 11/1999 | Gerace | |
| 6,026,368 A | 2/2000 | Brown et al. | |
| 6,134,532 A | 10/2000 | Lazarus et al. | |
| 6,594,691 B1 | 7/2003 | McCollum et al. | |
| 6,662,215 B1 | 12/2003 | Moskowitz et al. | |
| 6,925,440 B1 | 8/2005 | Shkedi | |
| 6,973,436 B1 | 12/2005 | Shkedi | |
| 6,983,379 B1 | 1/2006 | Spalink et al. | |
| 7,039,599 B2 | 5/2006 | Merriman et al. | |
| 7,062,510 B1 | 6/2006 | Eldering | |
| 7,072,853 B2 | 7/2006 | Shkedi | |
| 7,089,195 B2 | 8/2006 | Rosenberg | |
| 7,162,522 B2 | 1/2007 | Adar et al. | |
| 7,428,493 B2 | 9/2008 | Shkedi | |

(Continued)

OTHER PUBLICATIONS

Optimized Service Discovery Using QoS Based Ranking: A Fuzzy Clustering and Particle Swarm Optimization Approach Rajni Mohana; Deepak Dahiya 2011 IEEE 35th Annual Computer Software and Applications Conference Workshops Year: 2011 pp. 452-457, DOI: 10.1109/COMPSACW.2011.82 IEEE Conference Publications.*

(Continued)

*Primary Examiner* — Michael B Holmes
(74) *Attorney, Agent, or Firm* — Hanley, Flight & Zimmerman, LLC.

(57) ABSTRACT

A targeting rule set of association rules may be created. A plurality of association rules may be selected. A plurality of candidate rule sets may be constructed based on the plurality of association rules. The plurality of candidate rule sets may be evaluated to produce metrics. One of the plurality of candidate rule sets may be assigned as the targeting rule set based on the metrics. A custom list of user may be formed using association rules. A user may be determined to belong to a segment by applying one or more rules of a targeting rule set to user attribute data. A custom list of cookies to show advertising may be formed using combinations of association rules.

15 Claims, 13 Drawing Sheets

(56) References Cited

U.S. PATENT DOCUMENTS

| | | |
|---|---|---|
| 7,454,364 B2 | 11/2008 | Shkedi |
| 7,496,943 B1 | 2/2009 | Goldberg et al. |
| 7,533,012 B2 | 5/2009 | Walsh et al. |
| 7,617,122 B2 | 11/2009 | Kumar et al. |
| 7,991,800 B2 | 8/2011 | Lawrence et al. |
| 8,019,777 B2 | 9/2011 | Hauser |
| 8,024,323 B1 | 9/2011 | Nayfeh |
| 8,027,879 B2 | 9/2011 | Ramer et al. |
| 8,073,738 B2 | 12/2011 | Protheroe et al. |
| 8,108,245 B1 | 1/2012 | Hosea et al. |
| 8,234,166 B2 | 7/2012 | Filice et al. |
| 8,296,643 B1 | 10/2012 | Vasilik |
| 8,321,273 B2 | 11/2012 | Briggs |
| 9,269,049 B2* | 2/2016 | McCann ............... G06N 5/048 |
| 2002/0166258 A1 | 11/2002 | Posa |
| 2003/0014304 A1 | 1/2003 | Calvert et al. |
| 2003/0033196 A1 | 2/2003 | Tomlin |
| 2003/0036949 A1 | 2/2003 | Kaddeche et al. |
| 2003/0088485 A1 | 5/2003 | Feinberg |
| 2003/0135460 A1 | 7/2003 | Talegon |
| 2003/0167212 A1 | 9/2003 | Monteverde |
| 2004/0003036 A1 | 1/2004 | Eagle et al. |
| 2004/0015397 A1 | 1/2004 | Barry et al. |
| 2004/0024632 A1 | 2/2004 | Perry |
| 2004/0117460 A1 | 6/2004 | Walsh et al. |
| 2004/0117486 A1 | 6/2004 | Bourne et al. |
| 2004/0199397 A1 | 10/2004 | Dresden |
| 2005/0165643 A1 | 7/2005 | Wilson et al. |
| 2005/0166233 A1 | 7/2005 | Beyda et al. |
| 2005/0187818 A1 | 8/2005 | Zito et al. |
| 2005/0193020 A1 | 9/2005 | Shkedi |
| 2005/0222901 A1 | 10/2005 | Agarwal et al. |
| 2005/0235030 A1 | 10/2005 | Lauckhart et al. |
| 2005/0246736 A1 | 11/2005 | Beyda et al. |
| 2006/0026061 A1 | 2/2006 | Collins |
| 2006/0041562 A1 | 2/2006 | Paczkowski et al. |
| 2006/0059042 A1 | 3/2006 | Zohar |
| 2006/0212349 A1 | 9/2006 | Brady |
| 2006/0212350 A1 | 9/2006 | Ellis et al. |
| 2006/0242267 A1 | 10/2006 | Grossman |
| 2006/0282328 A1 | 12/2006 | Gerace et al. |
| 2007/0022009 A1 | 1/2007 | Cataldi et al. |
| 2007/0061195 A1 | 3/2007 | Liu et al. |
| 2007/0067215 A1 | 3/2007 | Agarwal et al. |
| 2007/0088609 A1 | 4/2007 | Reller et al. |
| 2007/0168506 A1 | 7/2007 | Douglas et al. |
| 2007/0294401 A1 | 12/2007 | Shkedi |
| 2008/0010155 A1 | 1/2008 | Shkedi |
| 2008/0040175 A1 | 2/2008 | Dellovo |
| 2008/0183561 A1 | 7/2008 | Zohar et al. |
| 2008/0195462 A1 | 8/2008 | Magdon-Ismail et al. |
| 2008/0209037 A1 | 8/2008 | Zernik et al. |
| 2008/0243531 A1 | 10/2008 | Hyder et al. |
| 2008/0243592 A1 | 10/2008 | Song et al. |
| 2008/0263627 A1 | 10/2008 | Berteau et al. |
| 2008/0275980 A1 | 11/2008 | Hansen |
| 2009/0006363 A1 | 1/2009 | Canny et al. |
| 2009/0024546 A1 | 1/2009 | Ficcaglia et al. |
| 2009/0055332 A1 | 2/2009 | Lee |
| 2009/0063250 A1 | 3/2009 | Burgess et al. |
| 2009/0063268 A1 | 3/2009 | Burgess et al. |
| 2009/0106296 A1 | 4/2009 | Sickmiller et al. |
| 2009/0125398 A1 | 5/2009 | Cochran et al. |
| 2009/0150126 A1 | 6/2009 | Sellamanickam et al. |
| 2010/0082507 A1 | 4/2010 | Ganapathi et al. |
| 2010/0082808 A1 | 4/2010 | Vaynblat et al. |
| 2010/0088177 A1 | 4/2010 | Lu et al. |
| 2010/0100415 A1 | 4/2010 | Plummer et al. |
| 2010/0179855 A1 | 7/2010 | Chen et al. |
| 2010/0228595 A1 | 9/2010 | Dempster et al. |
| 2010/0241510 A1 | 9/2010 | Zhang |
| 2010/0332426 A1 | 12/2010 | Van Bemmel |
| 2011/0125587 A1 | 5/2011 | Netzer et al. |
| 2011/0131099 A1 | 6/2011 | Shields et al. |
| 2011/0166927 A1 | 7/2011 | Bandi et al. |
| 2011/0173063 A1 | 7/2011 | Bhatia et al. |
| 2011/0173071 A1 | 7/2011 | Meyer et al. |
| 2011/0187717 A1 | 8/2011 | Jagannath et al. |
| 2011/0191169 A1 | 8/2011 | Cui et al. |
| 2011/0191170 A1 | 8/2011 | Zhang et al. |
| 2011/0191191 A1 | 8/2011 | Bax et al. |
| 2011/0208591 A1 | 8/2011 | Chen et al. |
| 2011/0218866 A1 | 9/2011 | Wilson |
| 2011/0231242 A1 | 9/2011 | Dilling et al. |
| 2011/0231244 A1 | 9/2011 | Bhatia et al. |
| 2011/0231245 A1 | 9/2011 | Bhatia et al. |
| 2011/0231246 A1 | 9/2011 | Bhatia et al. |
| 2011/0231253 A1 | 9/2011 | Crawford et al. |
| 2011/0238468 A1 | 9/2011 | Shen et al. |
| 2011/0246285 A1 | 10/2011 | Ratnaparkhi et al. |
| 2011/0258052 A1 | 10/2011 | Kakade et al. |
| 2011/0258054 A1 | 10/2011 | Pandey et al. |
| 2011/0270670 A1 | 11/2011 | Leathern |
| 2011/0270686 A1 | 11/2011 | Patwa et al. |
| 2011/0276391 A1 | 11/2011 | Hillard et al. |
| 2011/0282732 A1 | 11/2011 | Bax et al. |
| 2011/0282815 A1 | 11/2011 | Thomas |
| 2011/0310891 A1 | 12/2011 | Howe et al. |
| 2012/0004979 A1 | 1/2012 | Bhatia et al. |
| 2012/0004980 A1 | 1/2012 | Bhatia et al. |
| 2012/0004981 A1 | 1/2012 | Bhatia et al. |
| 2012/0010942 A1 | 1/2012 | Bax et al. |
| 2012/0022952 A1 | 1/2012 | Cetin et al. |
| 2012/0023043 A1 | 1/2012 | Cetin et al. |
| 2012/0036007 A1 | 2/2012 | Robertson et al. |
| 2012/0036008 A1 | 2/2012 | Robertson et al. |
| 2012/0066072 A1 | 3/2012 | Kanigsberg et al. |
| 2012/0078705 A1 | 3/2012 | Megdal |
| 2012/0078709 A1 | 3/2012 | Dunham et al. |
| 2012/0078711 A1 | 3/2012 | Mehta et al. |
| 2012/0084149 A1 | 4/2012 | Gaudiano et al. |
| 2012/0095845 A1 | 4/2012 | Shani |
| 2012/0095848 A1 | 4/2012 | Chan |
| 2012/0095985 A1 | 4/2012 | Shen et al. |
| 2012/0109745 A1 | 5/2012 | Bhamidipati |
| 2012/0116885 A1 | 5/2012 | Krishnamoorthy |
| 2012/0123851 A1 | 5/2012 | Bax et al. |
| 2012/0123859 A1 | 5/2012 | Gupta |
| 2012/0123863 A1 | 5/2012 | Kaul et al. |
| 2012/0150641 A1 | 6/2012 | Dobbs et al. |
| 2012/0166272 A1 | 6/2012 | Wiley et al. |
| 2012/0173326 A1 | 7/2012 | Tao et al. |
| 2012/0191528 A1 | 7/2012 | Bax et al. |
| 2012/0203642 A1 | 8/2012 | Park et al. |
| 2012/0253928 A1 | 10/2012 | Jackson et al. |
| 2012/0278158 A1 | 11/2012 | Farahat |
| 2012/0290403 A1 | 11/2012 | Galitzky et al. |
| 2013/0060785 A1* | 3/2013 | Sweeney ............... G06N 5/00 707/748 |
| 2014/0143019 A1* | 5/2014 | Lyons ............... G06Q 30/0204 705/7.33 |
| 2014/0250044 A1* | 9/2014 | McCann ............... G06N 5/02 706/47 |
| 2014/0337275 A1* | 11/2014 | McCann ............... G06N 5/048 706/52 |
| 2014/0379622 A1* | 12/2014 | Arsenault ............... G06N 5/04 706/14 |
| 2015/0088730 A1* | 3/2015 | Counts ............... G06Q 20/34 705/39 |
| 2015/0278858 A1* | 10/2015 | Lyons ............... G06Q 30/0269 705/14.51 |
| 2017/0193558 A1* | 7/2017 | Lyons ............... G06Q 30/0269 |

OTHER PUBLICATIONS

Real-Time Multiple-Vehicle Detection and Tracking System in Complex Environment with Automatic Lane Detection and Reducing Shadow Effects Bing-Fei Wu; Jhy-Hong Juang 2011 First International Conference on Robot, Vision and Signal Processing Year: 2011 pp. 23-26, DOI: 10.1109/RVSP.2011.29 IEEE Conference Publications.*

(56) References Cited

OTHER PUBLICATIONS

Outlier Detection for Transaction Databases Using Association Rules Kazuyo Narita; Hiroyuki Kitagawa 2008 The Ninth International Conference on Web-Age Information Management Year: 2008 pp. 373-380, DOI: 10.1109/WAIM.2008.58 IEEE Conference Publications.*

A procedure to obtain mill cutter and cutting parameters using parameter optimization under constraints and expert rules L. Rubio; M. de la Sen 2008 IEEE International Conference on Control Applications Year: 2008 pp. 534-539, DOI: 10.1109/CCA.2008.4629680 IEEE Conference Publications.*

"Nielsen Bridges Online and Offline Behaviors with Innovative Cross-Platform Offering," The Nielsen Company, 2012, Retrieved from the internet: Aug. 14, 2012, pp. 1-2.

"Online Advertising," Fresh Patents.com, Retrieved from the internet: Nov. 20, 2012, pp. 1-2, http://tgs.freshpatents.com/Online-Advertising-bx1.phphttp://tgs.freshpatents.com/Online-Advertising-bx1.php , retrieved on Nov. 20, 2012.

LaRue, "eXelate, Nielsen Catalina Solutions Partner to Bring CPG Data Online," Adotas, Jan. 31, 2012, Retrieved from the internet: Aug. 14, 2012, pp. 1-2.

Lykou et al., "Sparse CCA using a Lasso with positivity constraints," Computational Statistics and Data Analysis, 2010 vol. 54, pp. 3144-3157.

Soltani et al., "Flash Cookies and Privacy," 2009, Summer Undergraduate Program in Engineering Research at Berkeley (SUPERB), pp. 158-163.

Stage et al., "Measuring Similarity in Nearest Neighbor Imputation: Some New Alternatives," Proceedings of the Symposium on Statistics and Information technology in Forestry, 2003, pp. 1-6.

Witten et al., "A penalized matrix decomposition, with applications to sparse principal components and canonical correlation analysis," Biostatistics, 2009, vol. 10, No. 3, pp. 515-534.

\* cited by examiner

THRESHOLD 405-3
VALUE = 0.7

THRESHOLD 405-2
VALUE = 0.5

THRESHOLD 405-1
VALUE = 0.2

400A

REQUIREMENT 445-3: 100,000

REQUIREMENT 445-2: 100,000

REQUIREMENT 445-1: 100,000

THRESHOLD 405-3
VALUE = 0.7

THRESHOLD 405-2
VALUE = 0.5

THRESHOLD 405-1
VALUE = 0.2

WORKING RULES 410-1

RULE 2
RULE 3
RULE 4
RULE 5
...
RULE L 420-1

SCALE DATASET 415-1

| USER 1 | 1 | 1 | 1 | 0 | 1 |
|---|---|---|---|---|---|
| USER 3 | 1 | 0 | 1 | 0 | 0 |
| USER 4 | 1 | 1 | 0 | 0 | 1 |
| ... | | | | | |
| USER 1 | 1 | 0 | 1 | 0 | 1 |

CANDIDATE RULE SET 440-1
RULE 1

REQUIREMENT 445-3: 100,000

REQUIREMENT 445-2: 100,000

SCALE SIZE VALUE 430-1: 75,000
REQUIREMENT 445-1: 100,000

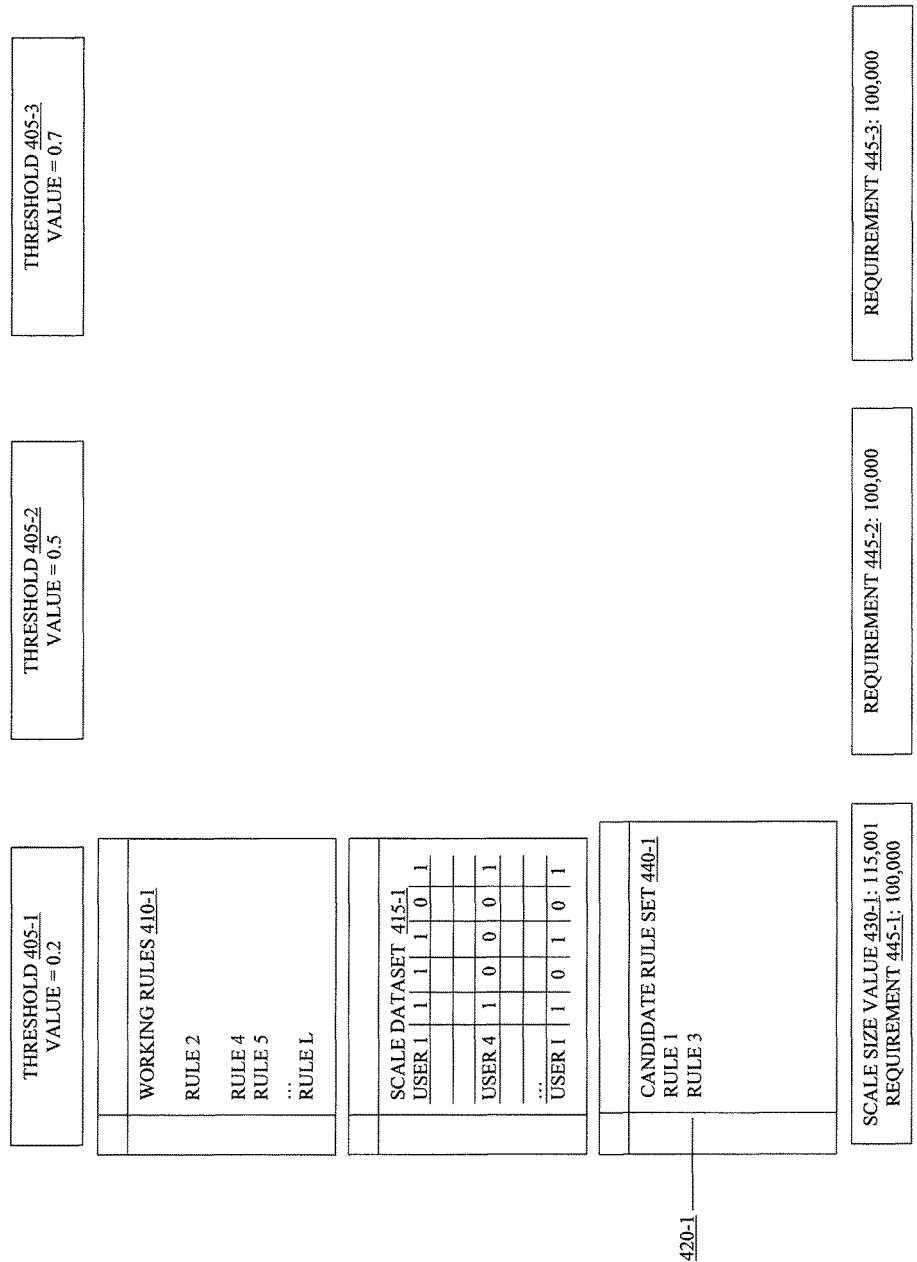

400H

METHOD AND SYSTEM USING ASSOCIATION RULES TO FORM CUSTOM LISTS OF COOKIES

BACKGROUND

Targeting and data collection techniques provide advertisers and other marketing organizations with market segment data related to advertising viewers, including, for example, computer users who view advertising on the World Wide Web (Web) or Internet. For advertising viewers such as Internet users, the available information related to each user depends, for example, on his or her historical Web behavior and, for example, on his or her origin environment, such as the user's computing platform, service provider, country, time of day, etc. A "market segment" or "segment" is a subset, or partial portion of a group that can be characterized in some way; a segment may also be a data object describing such a group.

Advertisers and other marketing organizations may create segment definitions to define groups of potential marketing targets (e.g., users) and direct advertising to those groups, such as groups of users on the Internet. "Data publishers" (or "data sellers") may sell information concerning targets or people, such as Internet users, and their behaviors, which advertisers and other marketing organizations may use to create, for example, behavioral segment definitions. An Internet user may access a Web site of a data publisher, such as a bicycling interest Web site, for example, and be identified as a user "interested in bicycling." Other attributes, such as time and location of the person's access, may also be identified. Data publishers may sell the identifying information about users who access their sites and receive income from sales based on this information's use.

User identification (ID) data from data publishers can be used to create segment definitions. In general, segment definitions may be characterized by specific values for available properties. For example, segment definitions might exist for categories such as "Gender", "Age" and "Nationality" and one segment combination might be defined with three properties as, "Male, 35-40, European." Once identified (e.g., from information from a data publisher (data seller)), a user who fits the characteristics of "Male, 35-40, European" can be grouped into and/or associated with this segment combination. An advertisement can be exposed to (or placed) with users identified with the segment combination, and data can be collected to determine how the users identified with that segment respond. Behavioral segment definitions for "Shopping Interest", "Running Interest" and "Web surfing interest" can be defined and Behavioral attributes, such as "likes to shop", "intensely likes running" or "Web surfs in the evening" can also be included in segment combinations. Segment combinations can have attributes that are purely behavioral, purely non-behavioral or a mixture of behavioral and non-behavioral.

The efficiency of a given advertisement depends on the match between the content of the advertisement (advertising content) and the market segment to which the content is exposed. In practice, a numeric "conversion ratio" value describes the efficiency or "success" relationship between the advertising content and target segment. A high conversion ratio value can show, for example, by various measures or various methods of determining or collecting such data, that a given advertisement or advertising campaign (group of advertisements) is well received by a given target segment.

It is perceived within the advertising and marketing industries that, in general, better and more accurate segment targeting capabilities could improve conversion ratios. High conversion ratios for advertisements, on the Internet and in other advertising venues, such as, e.g., print, outdoor, direct are desirable. Identification, for example, of a large user group with a high response rate to advertising and with members who respond in stable and predictable manners over time is desirable.

Within Internet marketing, serving systems for organizations executing advertisement placement in advertising campaigns may execute "media optimization" when placing an advertisement on a particular Web site or with a particular media publisher. Media optimization may include analyzing parameters in segment combinations to identify values for each parameter that may yield the "best results" for each advertisement the serving system runs. A serving system may be a networked computing system that enables an operator to place advertisements on particular Web pages. Serving systems place advertisements on behalf of an advertiser or advertising agency, and can be operated by a number of entities such as an independent operator working with an advertiser or advertising agency.

One approach to Internet marketing uses association algorithms to create set of rules. An association algorithm is an algorithm for learning association rules. Association algorithms attempt to find subsets that are common to at least a minimum number of item sets. Association algorithms typically use a "bottom up" approach, in which frequent subsets are extended one item at a time to create candidates, and successful groups of candidates are tested against the data. The algorithm terminates when no further successful extensions are found. Many software implementations of different forms of association algorithms exist. For example, the "arules" package for the R Project for Statistical Computing provides the an implementation for representing, manipulating and analyzing transaction data and patterns, including frequent item sets and association rules. The package also provides interfaces to implementations of the association mining algorithms apriori and Eclat by C. Borgelt.

The rules may be useful for determining whether a user is likely to respond to a an advertisement given one or more attributes. However, as number of attributes increases, generating more complex association rules becomes increasingly difficult and computationally prohibitive. For example, when developing rules based on 5 attributes out of a total of 10,000 attributes, over $8.325 \times 10^{17}$ combinations are possible.

With the development of the Internet advertising market, information about the people most likely to visit a website and information about the people most likely to purchase a product from visiting a website is increasingly more valuable. These people may be classified into modeled audience extensions, which defines segments that define users most likely to take certain actions. More accurate and efficient identification of modeled audience extensions can lead to more conversions and better return on investment for advertising money spent.

Serving systems using available media optimization algorithms have distinct limitations. First, segment content does not get improved with time, because systems do not allow for improvements as more data is amassed. Second, current systems cannot place people into segments that define the most likely people to visit a website or most likely people to purchase a product from visiting a website without a tremendous amount of pre-processing. Third, it is incredibly difficult and sometimes computationally impossible to develop effective sets of rules based on association algorithms. Fourth, association rules do not always deliver the required minimum number of likely responders when applied to a dataset over a given period of time, and combining rules often results in situations where the rules have a lower lift because they often have a large number of disparate members. In these situations, the separate rules may have both overlapping responders and overlapping non-responders, but the combined rule only increases the number of non-responders. Additionally, current systems do not provide adequate centralization, in which behavioral aspects from a wide group of data publishers provide an advantage in manipulating a wide variety of data and could enhance segment groupings.

In general, there is a need for improved techniques for selecting association rules when determining potential responders, in the advertising and marketing fields in general and, in particular, with regard to Internet advertising.

SUMMARY

Various embodiments are generally directed to creating a targeting rule set of association rules using association rules to form a custom list of users to overcome the aforementioned problems.

One embodiment may include a method for creating a targeting rule set of association rules, the method comprising: selecting, with one or more computers, a plurality of association rules; constructing, with the one or more computers, a plurality of candidate rule sets based on the plurality of association rules; evaluating, with the one or more computers, the plurality of candidate rule sets to produce metrics; and assigning, with the one or more computers, one of the plurality of candidate rule sets as the targeting rule set based on the metrics.

One embodiment may include a system for creating a targeting rule set of association rules, the system comprising: a memory; and a processor configured to: select a plurality of association rules; construct a plurality of candidate rule sets based on the plurality of association rules; evaluate the plurality of candidate rule sets to produce metrics; and assign one of the plurality of candidate rule sets as the targeting rule set based on the metrics.

One embodiment may include a computer readable storage medium for creating a targeting rule set of association rules, the computer readable storage medium comprising instructions that if executed enable a computing system to: select a plurality of association rules; construct a plurality of candidate rule sets based on the plurality of association rules; evaluate the plurality of candidate rule sets to produce metrics; and assign one of the plurality of candidate rule sets as the targeting rule set based on the metrics.

One embodiment may include a method for using association rules to form a custom list of users, the method comprising: determining, with one or more computers, that a user belongs to a segment by applying one or more rules of a targeting rule set to user attribute data, wherein the targeting rule set was created by a process comprising: selecting, with one or more computers, a plurality of association rules; constructing, with the one or more computers, a plurality of candidate rule sets based on the plurality of association rules; evaluating, with the one or more computers, the plurality of candidate rule sets to produce metrics; and assigning, with the one or more computers, one of the plurality of candidate rule sets as the targeting rule set based on the metrics; and adding, by the one or more computers, the user to a segment.

One embodiment may include a computer readable storage medium for using association rules to form a custom list of users, the computer readable storage medium comprising instructions that if executed enable a computing system to: determine that a user belongs to a segment by applying one or more rules of a targeting rule set to user attribute data, wherein the targeting rule set was created by a process comprising: selecting, with one or more computers, a plurality of association rules; constructing, with the one or more computers, a plurality of candidate rule sets based on the plurality of association rules; evaluating, with the one or more computers, the plurality of candidate rule sets to produce metrics; and assigning, with the one or more computers, one of the plurality of candidate rule sets as the targeting rule set based on the metrics; and add the user to a segment.

One embodiment may include a method for using combinations of association rules to form a custom list of cookies to show advertising, the method comprising: receiving first party data from a provider via files, tags, or any combination thereof; constructing association rules using an association algorithm; selecting a subset of the association rules; placing the subset of the association rules in a platform; creating a segment using the platform; and selling the segment to the provider of the first party data.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

Embodiments will now be described in connection with the associated drawings, in which:

FIGS. 4A-4H depict various stages of an example of constructing a plurality of candidate rule sets in accordance with one or more embodiments.

DETAILED DESCRIPTION OF THE DRAWINGS

Exemplary embodiments are discussed in detail below. While specific exemplary embodiments are discussed, it should be understood that this is done for illustration purposes only. In describing and illustrating the exemplary embodiments, specific terminology is employed for the sake of clarity. However, the embodiments are not intended to be limited to the specific terminology so selected. A person skilled in the relevant art will recognize that other components and configurations may be used without parting from the spirit and scope of the embodiments. It is to be understood that each specific element includes all technical equivalents that operate in a similar manner to accomplish a similar purpose. The examples and embodiments described herein are non-limiting examples.

Figure 1:
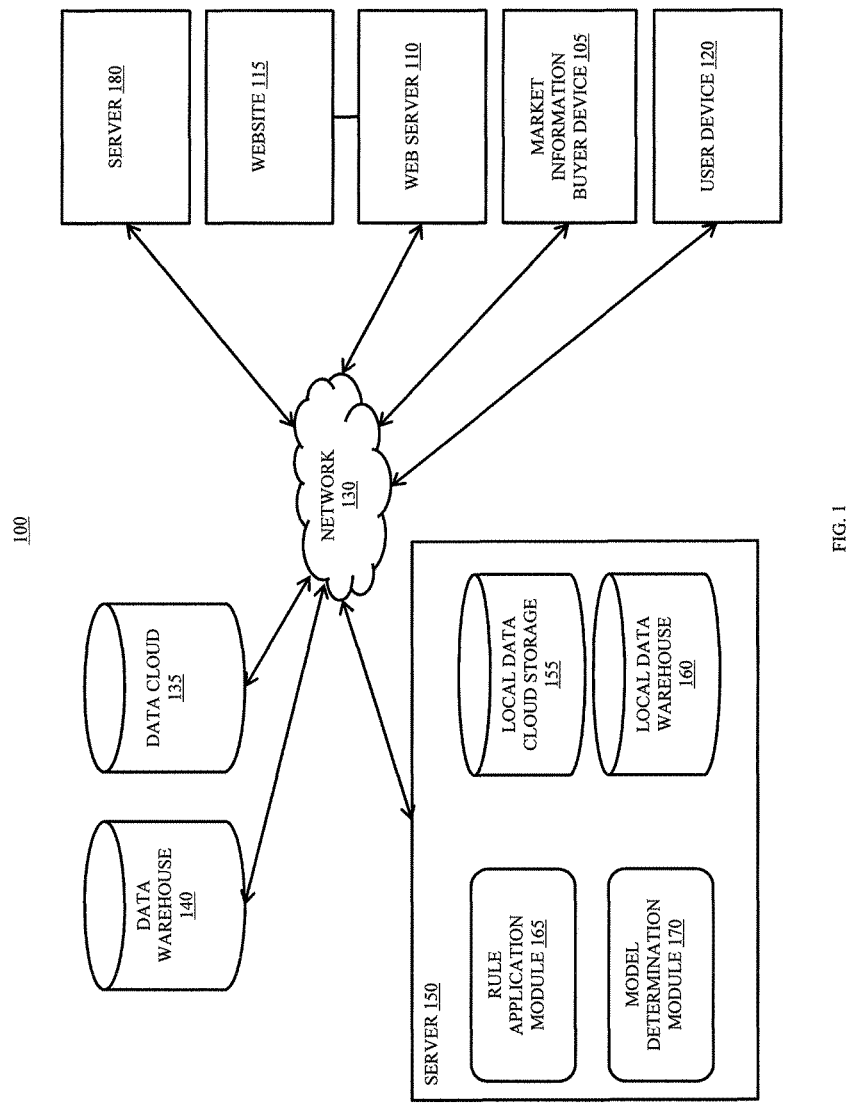
FIG. 1 depicts a schematic block diagram of an exemplary system in accordance with one or more embodiments.

FIG. 1 depicts a schematic block diagram of an exemplary system in accordance with one or more embodiments. System 100 may include market information buyer device 105, web server 110, website 115, user device 120, network 130, data cloud 135, data warehouse 140, server 150, local data cloud storage 155, local data warehouse 160, rule application module 165, model determination module 170, and server 180.

Market information buyer device 105 and user device 120 may be any type of computing device, including a mobile telephone, a laptop, tablet, or desktop computer having, a netbook, a video game device, a pager, a smart phone, an ultra-mobile personal computer (UMPC), or a personal data assistant (PDA). Market information buyer device 105 and user device 120 may run one or more applications, such as Internet browsers, voice calls, video games, videoconferencing, and email, among others. Market information buyer device 105 and user device 120 may be any combination of computing devices. These devices may be coupled to network 130.

Web server 110, server 150, or server 180 may also be any type of computing device coupled to network 130, including but not limited to a personal computer, a server computer, a series of server computers, a mini computer, and a mainframe computer, or combinations thereof. Web server 110, server 150, or server 180 may be a web server (or a series of servers) running a network operating system, examples of which may include but are not limited to Microsoft Windows Server, Novell NetWare, or Linux. Any of the features of server 150 may be also implemented in server 180.

Network 130 may provide network access, data transport and other services to the devices coupled to it. In general, network 130 may include and implement any commonly defined network architectures including those defined by standards bodies, such as the Global System for Mobile communication (GSM) Association, the Internet Engineering Task Force (IETF), and the Worldwide Interoperability for Microwave Access (WiMAX) forum. For example, network 130 may implement one or more of a GSM architecture, a General Packet Radio Service (GPRS) architecture, a Universal Mobile Telecommunications System (UMTS) architecture, and an evolution of UMTS referred to as Long Term Evolution (LTE). Network 130 may, again as an alternative or in conjunction with one or more of the above, implement a WiMAX architecture defined by the WiMAX forum. Network 130 may also comprise, for instance, a local area network (LAN), a wide area network (WAN), the Internet, a virtual LAN (VLAN), an enterprise LAN, a layer 3 virtual private network (VPN), an enterprise IP network, or any combination thereof.

Website 115 may be any type of website or web page. For example, website 115 may be coded using hypertext markup language ("HTML"), XML, XHTML, JavaScript, Java, Perl, Visual Basic, Hypertext Preprocessor scripts ("PHP"), Active Server Page scripts ("ASP"), common gate interface ("CGI") scripts, server side includes, and combinations thereof.

Data cloud 135 may be any combination of hardware or software used to store information in a distributed and redundant manner. Data cloud 135 may be implemented in or managed by server 150 as local data cloud storage 155, server 180, other servers, or any combination thereof. Data cloud 135 may be distributed across a number of devices, in which each device may replicate all of the data or portions of the data stored on any combination of devices used by data cloud 135. Data cloud 135 may be configured to be updated in real-time when one or more of the devices housing data cloud 135 receives new data. For example, when information is added to or stored on data cloud 135 by server 150, the information may be distributed to other servers maintaining data cloud 135 in real-time. Data cloud 135 may be configured to store any type or combination of data. Data cloud 135 may be configured to only store data for a certain period of time. For example, data cloud 135 may expunge any data that has been in data cloud 135 for more than 60 days. The period of time may be any period of time.

Data warehouse 140 and local data warehouse 160 may be any type of database, including databases managed by a database management system (DBMS). A DBMS is typically implemented as an engine that controls organization, storage, management, and retrieval of data in a database. DBMSs frequently provide the ability to query, backup and replicate, enforce rules, provide security, do computation, perform change and access logging, and automate optimization. Examples of DBMSs include Oracle database, IBM DB2, Adaptive Server Enterprise, FileMaker, Microsoft Access, Microsoft SQL Server, MySQL, PostgreSQL, and a NoSQL implementation, such as Hadoop or MongoDB. A DBMS typically includes a modeling language, data structure, database query language, and transaction mechanism. The modeling language is used to define the schema of each database in the DBMS, according to the database model, which may include a hierarchical model, network model, relational model, object model, or some other applicable known or convenient organization. Data structures can include fields, records, files, objects, and any other applicable known or convenient structures for storing data. A DBMS may also include metadata about the data that is stored.

Rule application module 165 may be a module that is configured to send, process, and receive information at server 150. Rule application module 165 may provide another mechanism for sending and receiving data at server 150 besides handling requests through web server 110. Rule application module 165 may send and receive information using any technique for sending and receiving information between processes or devices including using a scripting language, a remote procedure call, an email, a tweet, an application programming interface, Simple Object Access Protocol (SOAP) methods, Common Object Request Broker Architecture (CORBA), any interface for software components to communicate with each other, using any other known technique for sending information from a one device to another, or any combination thereof.

Model determination module 170 may be a module that is configured to send, process, and receive information at server 150. Model determination module 170 may provide another mechanism for sending and receiving data at server 150 besides handling requests through web server 110. Model determination module 170 may send and receive information using any technique for sending and receiving information between processes or devices including using a scripting language, a remote procedure call, an email, a tweet, an application programming interface, Simple Object Access Protocol (SOAP) methods, Common Object Request Broker Architecture (CORBA), any interface for software components to communicate with each other, using any other known technique for sending information from a one device to another, or any combination thereof.

Figure 2:
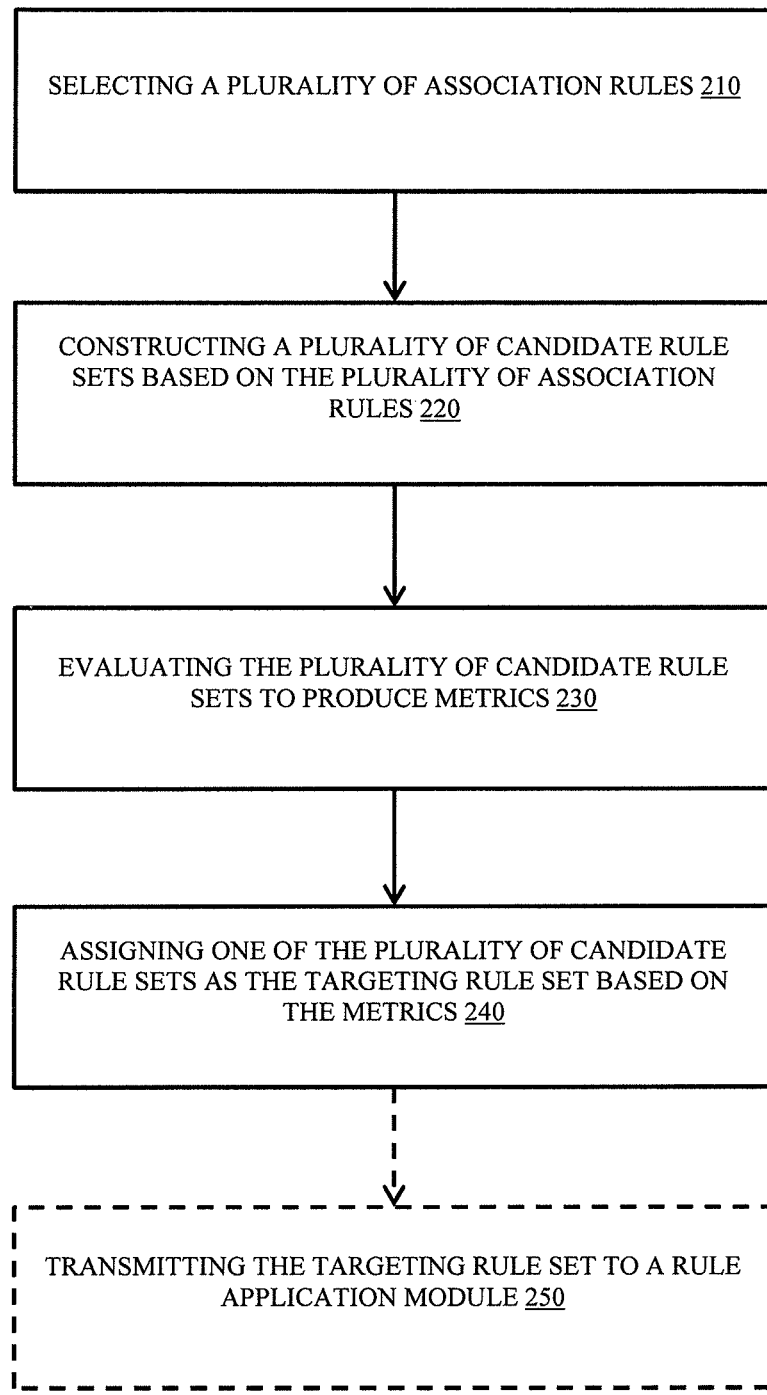
FIG. 2 depicts a block flow diagram of an exemplary method for creating a targeting rule set of association rules in accordance with one or more embodiments.

FIG. 2 depicts a block flow diagram of an exemplary method for creating a targeting rule set of association rules in accordance with one or more embodiments. In block 210, model determination module 170 may select a plurality of association rules. The association rules may be apriori rules. In some embodiments, model determination module 170 may select the plurality of association rules based on or from a training data set. The training data set may contain values received from tracking cookies, any other source, or any combination thereof. The training data set may include values that indicate whether a plurality of attributes are associated with one or more users. The values may be represented or stored in in a list, in a matrix, in any other form for storing data, or combinations thereof. For example, Table 1 depicts a matrix of exemplary attribute values for attributes 1-m associated with a plurality of users 1-n. The value 1 may indicate that an attribute is associated with a given user; the value 0 may indicate that an attribute is not associated with a given user.

TABLE 1

| Users | Attribute 1 | Attribute 2 | Attribute 3 | ... | Attribute m |
|---|---|---|---|---|---|
| User 1 | 1 | 0 | 0 | ... | 1 |
| User 2 | 0 | 0 | 1 | ... | 0 |
| ... | ... | ... | ... | ... | ... |
| User n | 1 | 1 | 0 | ... | 0 |

In some embodiments, model determination module 170 may select a plurality of association rules using any association algorithm. For example, the arules package for the R Project may be used to produce a plurality of association rules based on the training data set.

The performance of rules or rule sets may be evaluated based on one or more metrics. The one or more metrics may include support, confidence, coverage, scale, conditional support, conditional coverage, lift, conditional lift, and any combination thereof. Support is a measure of the percentage of task-relevant data transactions for which a rule is satisfied. For example, the support for the rule A→B may be measured by (number of transactions containing both A and B)/(number of total transactions). Confidence is the measure of certainty or trustworthiness associated with each discovered pattern. For example, the confidence for the rule A→B may be measured by (number of transactions containing both A and B)/(number of transactions containing A). Coverage is a measure of the minimum number of transactions that should be produced when applying one or more rules to a data set. Scale is a measure of coverage as applied to a particular dataset for a given timeframe. Conditional support is a measure of support given that certain transactions have been removed from the dataset. Conditional coverage is a measure of coverage given that certain transactions have been removed from the dataset. Lift is a measure of the probability of a transaction occurring divided by the probability that an event occurs. For example, the lift for the rule A→B may be measured by ((number of transactions containing both A and B)/(number of transactions containing A))/((number of transactions containing B)/(total number of transactions)). The lift of rule set D&E→B and F&G→B would be ((number of transactions containing both (D&E or F&G) and B)/(number of transactions containing (D&E or F&G)))/((number of transactions containing B)/(total number of transactions)). Conditional lift is a measure of lift given that certain transactions have been removed from the dataset.

In block 220, model determination module 170 may construct a plurality of candidate rule sets based on the plurality of association rules. Techniques for constructing a plurality of candidate rule sets will be discussed further with respect to FIG. 3.

In block 230, model determination module 170 may evaluate the plurality of candidate rule sets to produce metrics. Each of the plurality of candidate rule sets may be evaluated using a holdout dataset. The holdout dataset may contain the same types of information as the training data set. Each of the plurality of candidate rule sets may be evaluated by applying the rule sets to the holdout dataset. In some embodiments, the metrics produced is an f-measure for each rule set. The f-measure may be any weighted average of precision and recall. Precision may be a number of correct results divided by the number of all returned results. Recall may be the number of correct results divided by the number of results that could have been returned In some embodiments, the metrics may be any combination of metrics.

In block 240, model determination module 170 may assign one of the plurality of candidate rule sets as the targeting rule set based on the metrics. The targeting rule set may be the rule set of the candidate rule sets with the highest or lowest valued metric or metrics. The metric may be any combination of metrics. For example, the rule set with the highest f-measure from the candidate rule sets may be assigned as the targeting rule set.

In block 250, model determination module 170 may transmit the targeting rule set to rule application module 165. Rule application module 165 may be on a server. In some embodiments, model determination module 170 may transmit the targeting rule set to a computing device. Model determination module 170 may transmit the targeting rule set to rule application module 165 using any technique for transmitting data.

Figure 3:
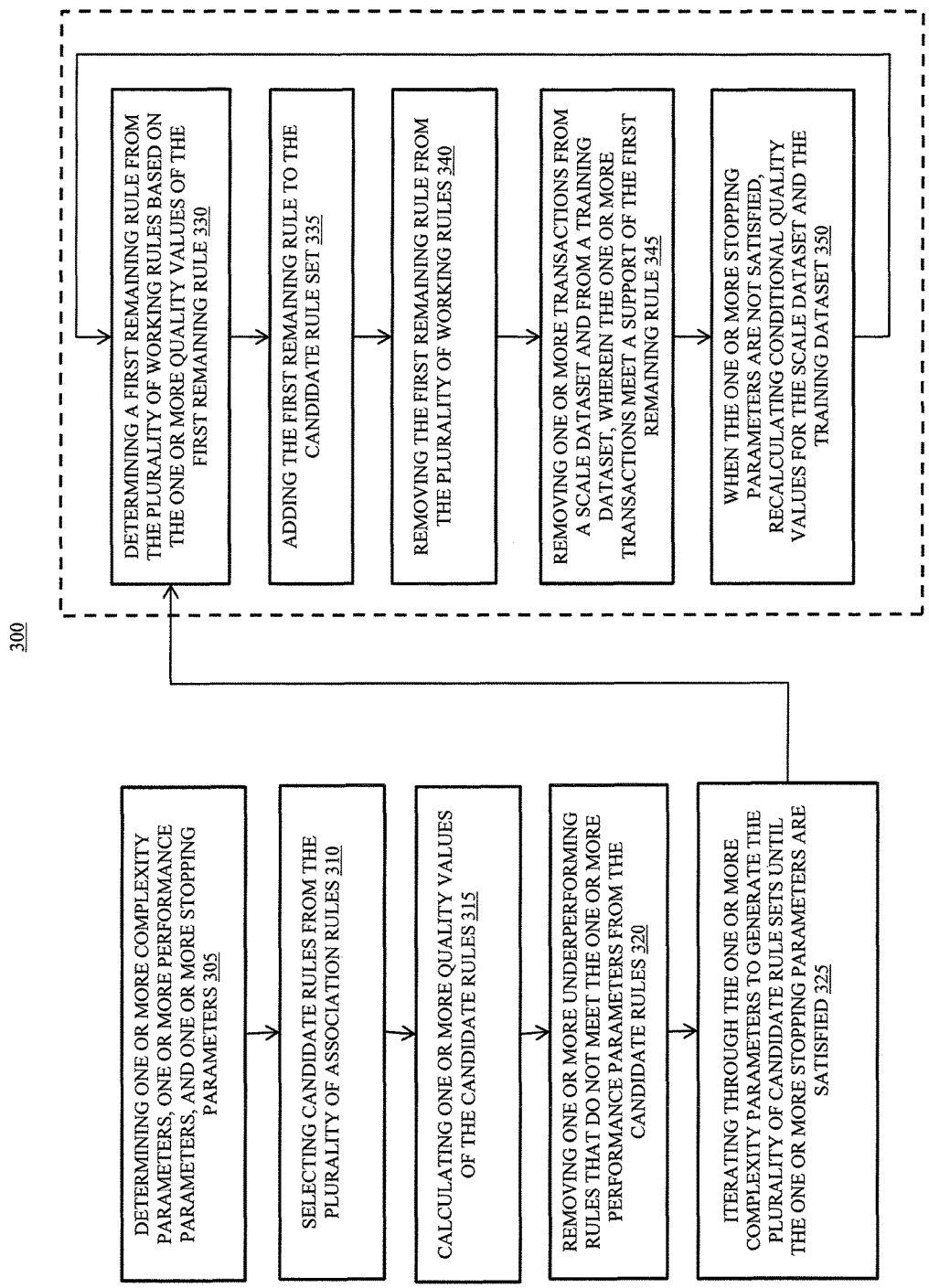
FIG. 3 depicts a block flow diagram of an exemplary method for determining a plurality of candidate rule sets based on the plurality of association rules in accordance with one or more embodiments.

FIG. 3 depicts a block flow diagram of an exemplary method for constructing a plurality of candidate rule sets based on the plurality of association rules in accordance with one or more embodiments. In block 305, model determination module 170 may determine one or more complexity parameters, one or more performance parameters, and one or more stopping parameters. A complexity parameter may include a minimum per-rule support threshold in one or more datasets or datasets with transactions removed. A performance parameter may include any metric or combination of metrics. A stopping parameter may include a scale size value requirement. For example, the scale size value requirement may indicate a number of transactions in the scale dataset that are satisfied by a ruleset. In some embodiments, model determination module 170 may determine one or more complexity parameters, one or more performance parameters, or one or more stopping parameters by receiving them from a storage. In some embodiments, model determination module 170 may determine one or more complexity parameters, one or more performance parameters, or one or more stopping parameters concurrently with any of the other method steps.

In block 310, model determination module 170 may select candidate rules from the plurality of association rules. In block 315, model determination module 170 may calculate one or more quality values of the candidate rules. A quality value may include any metric or combination of metrics associated with a rule. In block 320, model determination module 170 may remove one or more underperforming rules that do not meet the one or more performance parameters from the candidate rules. For example, rules that do not meet a minimum required lift or support may be removed from the candidate rules.

In block 325, model determination module 170 may iterate through the one or more complexity parameters to generate the plurality of candidate rule sets until the one or more stopping parameters are satisfied, wherein each of the one or more complexity parameters corresponds to a plurality of working rules of the candidate rules. For example, the complexity parameters may include multiple minimum per-rule support thresholds or candidate minimum scale support in one or more datasets or datasets with transactions removed. Each minimum per-rule support threshold might correspond to a set of working rules, so that in each of the rules in a set of workings rules meets the corresponding minimum per-rule support threshold. Then, each set of working rules that corresponds to one of the one or more complexity parameters may be evaluated and a candidate rule set generated for each set of working rules. In some embodiments, the candidate rule set with the best performance when run on the holdout dataset may be selected as the targeting rule set. In some embodiments, one or more candidate rule sets may be selected as the best performing. The level of performance may be based any metric or combination of metrics, e.g., the rule set with the highest f-measure.

Iterating through the one or more complexity parameters to generate the plurality of candidate rule sets until the one or more stopping parameters are satisfied may further comprise one or more of the steps in blocks 330, 335, 340, 345, and 350.

In block 330, model determination module 170 may determine a first remaining rule from the plurality of working rules based on the one or more quality values of the first remaining rule. The rule selected to be the first remaining rule may be selected based on the support of the rule with respect to the scale dataset, the confidence of the rule with respect to the scale dataset, the coverage of the rule with respect to the scale dataset, the scale of the rule with respect to the scale dataset, the lift of the rule with respect to the scale dataset, one or more quality values of the first remaining rule, one or more quality values of the first remaining rule compared to one or more quality values of other rules, or any combination thereof. In subsequent iterations of block 330, the metrics may be recalculated based on the changes made to the working rules, the scale dataset, and the training dataset; the selection of subsequent first remaining rules may be based on the recalculated metrics. The rule selected to be the first remaining rule may be selected based on the rule's conditional lift, and the rule may meet the minimum conditional support in the training and scale datasets. During the first iteration of block 330 for a corresponding complexity parameter of the one or more complexity parameters, the corresponding candidate rule set may be initialized to an empty set to which rules may be added.

In block 335, model determination module 170 may add the first remaining rule to a candidate rule set of the plurality of candidate rule sets. The candidate rule set may correspond to one of the one or more complexity parameters, a current minimum per-rule support threshold, a candidate minimum scale support, and combination thereof.

In block 340, model determination module 170 may remove the first remaining rule from the plurality of working rules. In block 345, model determination module 170 may remove one or more transactions from a scale dataset and from a training dataset, wherein the one or more transactions meet a support of the first remaining rule. A scale dataset may include the same types of information as a training data set. The steps in block 340 and block 345 may alter the scale dataset and the plurality of working rules. In subsequent iterations of the steps in blocks 340-355, the altered scale dataset may become the scale dataset for a subsequent iteration of steps 330, 335, 340, 345, 350, or any combination thereof, and the altered plurality of working rules may become the plurality of working rules for a subsequent iteration of steps 330, 335, 340, 345, 350, or any combination thereof, while building rules for the current candidate ruleset.

In block 350, when the one or more stopping parameters are not satisfied, model determination module 170 may recalculate conditional quality values for the scale dataset and the training dataset and perform a subsequent iteration of steps 330, 335, 340, 345, 350, or any combination thereof. If the one or more stopping parameters are satisfied or the conditions of the one or more stopping parameters are met, model determination model 170 move on to the next iteration of the one or more complexity values.

FIGS. 4A-4H depict various stages of an example of constructing a plurality of candidate rule sets in accordance with one or more embodiments. In stage 400A of FIG. 4A, one or more complexity parameters, one or more performance parameters, and one or more stopping parameters may be determined. The complexity parameters may minimum per-rule support thresholds 405-1 to 405-3. The one or more performance parameters may be a minimum lift. The one or more stopping parameters may be scale size requirements 445-1, 445-2, and 445-3. In this example, minimum per-rule support threshold 405-1 has a value of 0.2, minimum per-rule support threshold 405-2 has a value of 0.5, and minimum per-rule support threshold 405-3 has a value of 0.7. In this example, the scale size requirements 445-1, 445-2, and 445-3 may each have a value of 100,000. However, the scale size requirements may vary and need not be the same number. Several candidate rules may be selected from the plurality of association rules may be chose. Quality values may be calculated for the candidates rules using the training set. Rules that do not meet the one or more performance parameters may be removed from the candidate rules.

Figure 4B:
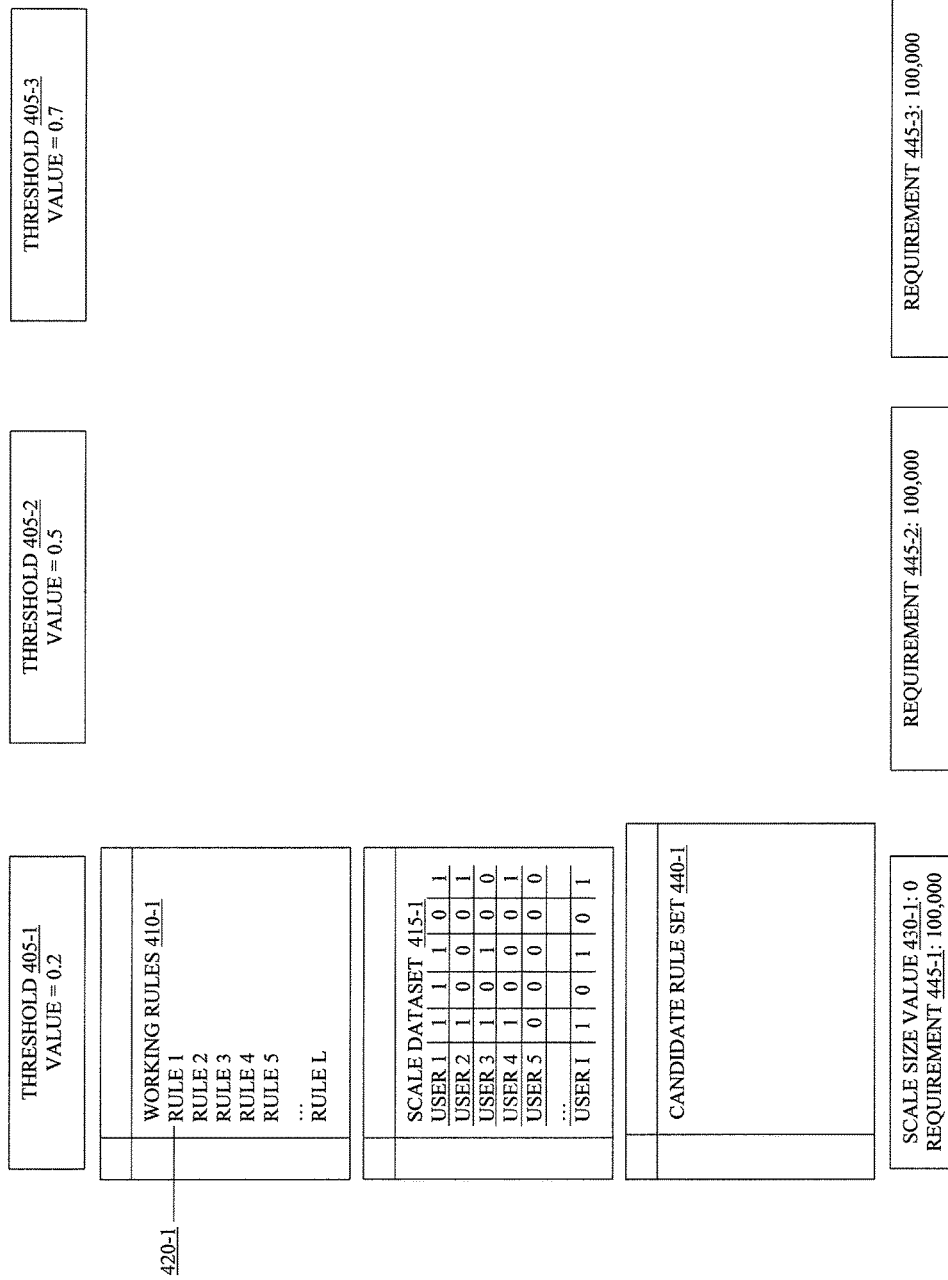
Figure 4C:
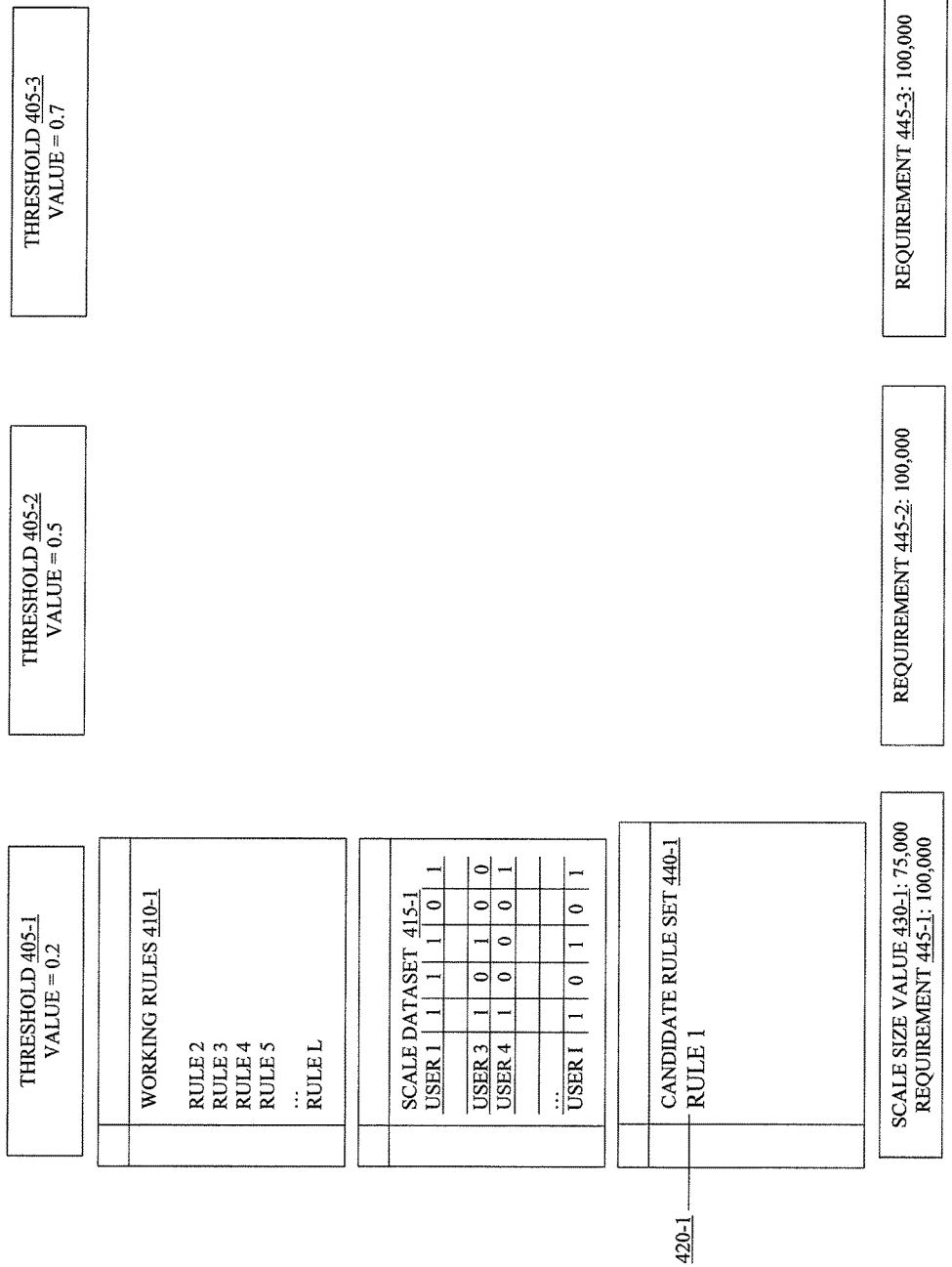
Figures 4F, 4G:
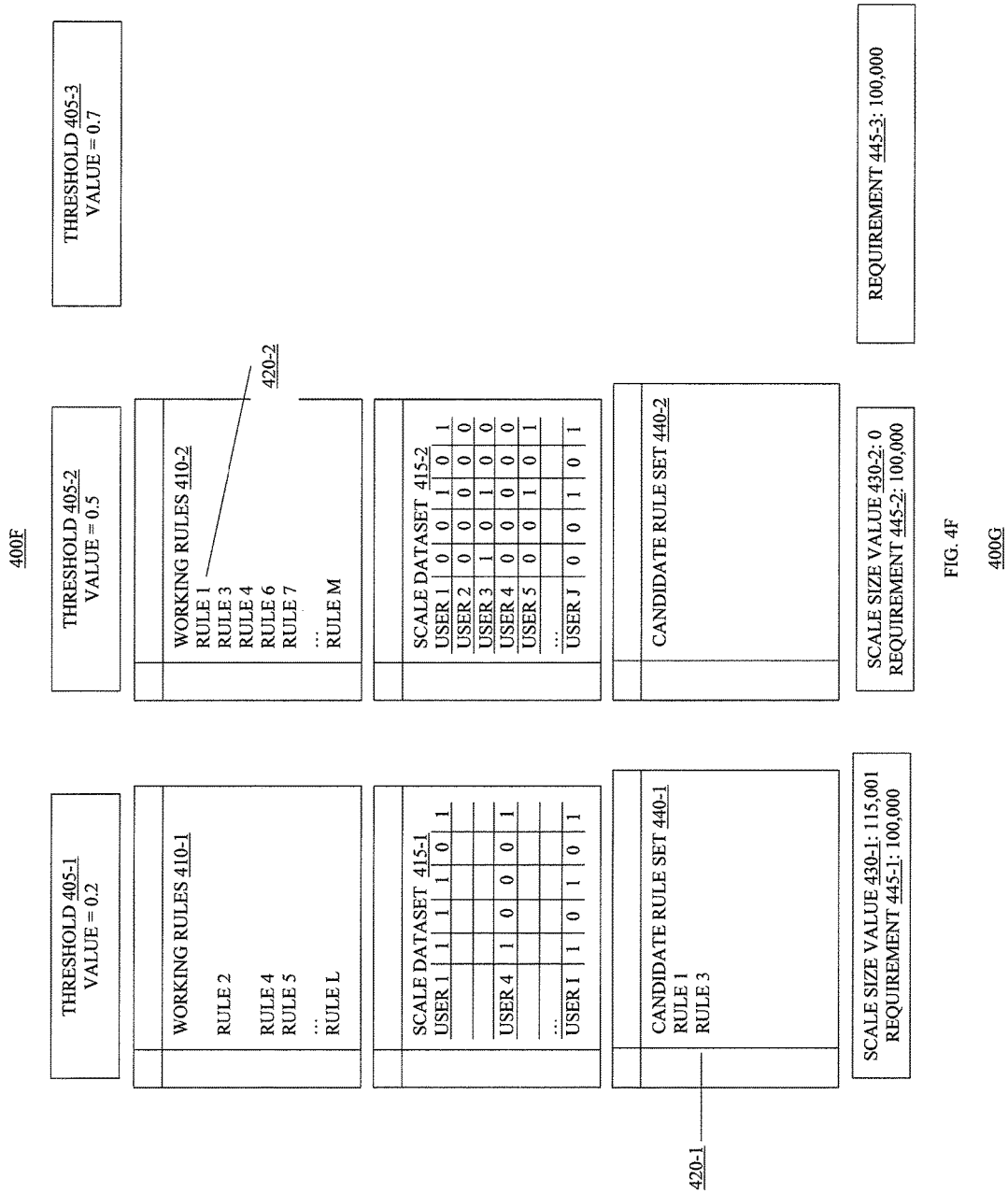
Figure 4G:
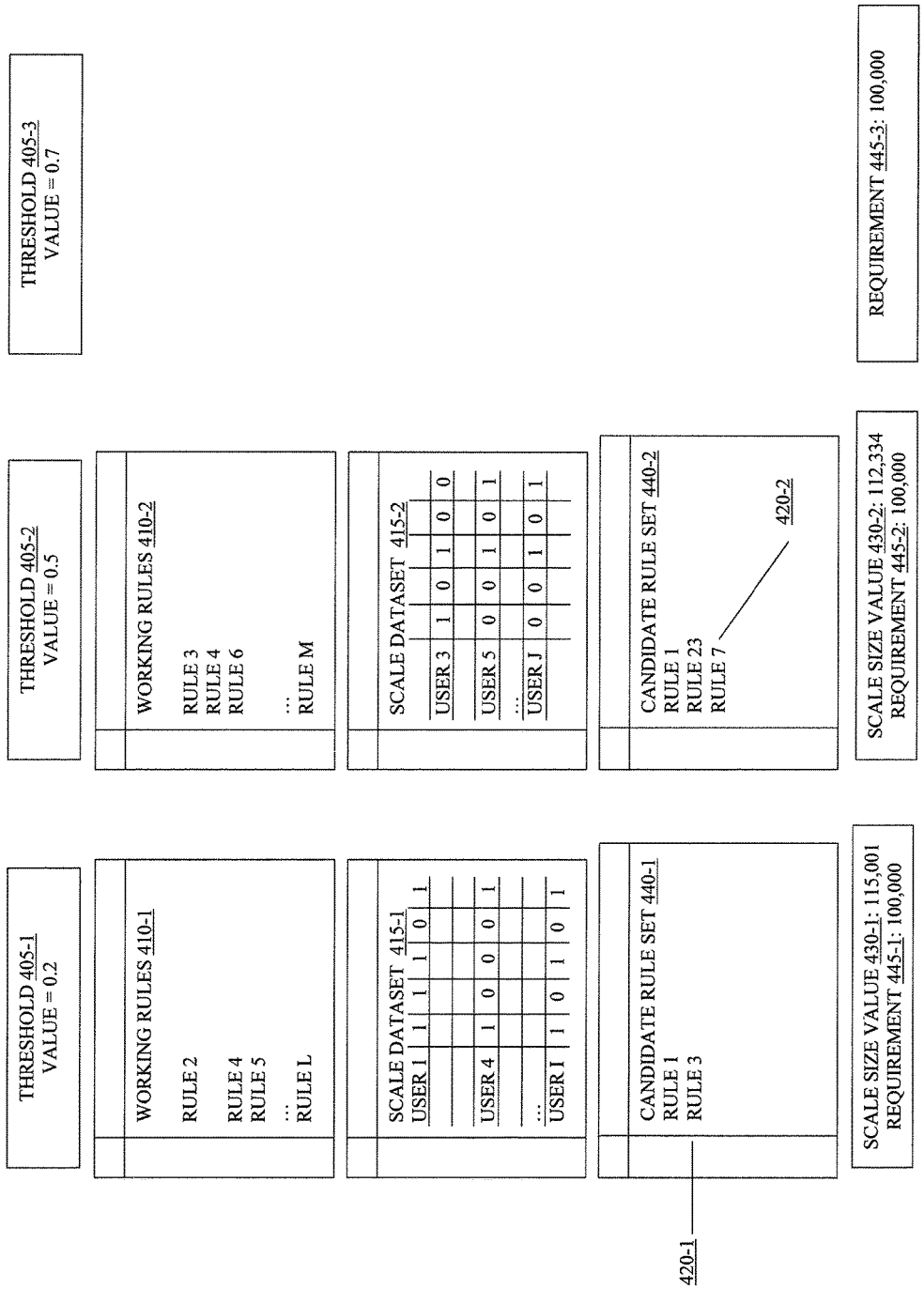

In stage 400B of FIG. 4B, iterations through the complexity parameters to generate a plurality of candidate result sets may begin. The iterations may be performed until the one or more stopping parameters are satisfied.

During the first iteration, a first remaining rule 420-1 may be determined from the plurality of working rules 410-1. A plurality of working rules 410-1 based on the candidate rules may be determined. Each of the rules from the candidate rules that has a support that satisfies the current minimum per-rule support threshold 405-1 may be placed into working rules 410-1. In this example, working rules 410-1 are the rules from the plurality of association rules that have a support value greater than or equal to 0.2. The metrics for the plurality of working rules 410-1 may be calculated when selecting the association rules. In some embodiments, the metrics for the plurality of working rules 410-1 may be calculated using a labeled training set. In this example, RULE 1 is chosen because it has the highest support value as a quality value. In stage 400C of FIG. 4C, first remaining rule 420-1 may be added to candidate rule set 440-1 and removed from the plurality of working rules 410-1. Candidate rule set 440-1 may be the rule set of the plurality of candidate rule sets that corresponds to minimum per-rule support threshold 405-1. Transactions that meet the support of first remaining rule 420-1 may be removed from scale dataset 415-1 and from a training dataset (not shown). In this example, USER 2, USER 5, and 74,998 other users (not shown) are the values that satisfy RULE 1 and are removed from scale dataset 415-1. Because 75,000 users were removed from the scale dataset 415-1, the current scale size value 430-1 increases from 0 to 75,000.

Because the current scale size value 430-1 (75,000) does not satisfy scale size requirement 445-1 (100,000) (one of the stopping parameters), the processes of selecting rules for candidate rule set may begin another iteration through steps 330 through 350. Metrics for the plurality of working rules 410-1 may be recalculated using the modified scale dataset 415-1. In some embodiments, metrics for the plurality of working rules 410-1 may be recalculated using a modified version of a labeled training set in which the values that satisfied the previously selected candidate rules have been removed. In some embodiments, one or more quality values may be calculated for the plurality of working rules 410-1 may be calculated using the training set.

In stage 400D of FIG. 4D, another first remaining rule 420-1 may be determined from the plurality of working rules 410-1. In this example, RULE 3 may be chosen because it has the highest support value after the recalculation.

In stage 400E of FIG. 4E, first remaining rule 420-1 may be removed from the plurality of working rules 410-1 and added to candidate rule set 440-1. Transactions that meet the support of the first remaining rule 420-1 may be removed from scale dataset 415-1 and the training dataset. In this example, USER 3 and 40,000 other users (not shown) are the values that satisfy RULE 1 and are removed from scale dataset 415-1. Because 40,001 additional users were removed from the scale dataset 415-1, the current scale size value 430-1 increases from 75,000 to 115,001. Because the current scale size value 430-1 (115,001) satisfies the scale size requirement 445-1 (100,000), candidate rule set 440-1 may be complete.

Next, another of the complexity parameters is iterated through. In this example, minimum per-rule support threshold 405-2 is selected as the current minimum per-rule support threshold. A plurality of working rules 410-2 based on the candidate rules may be determined. Each of the rules from the candidate rules that has a support that satisfies the current minimum per-rule support threshold 405-2 may be placed into working rules 410-2. In this example, working rules 410-2 are the rules from the plurality of association rules that have a support value greater than or equal to 0.5. For example, RULE 2 is a rule that did not have a support that satisfies the 0.5 threshold and is not included in working rules 410-2.

A first remaining rule 420-2 may be determined from the plurality of working rules 410-2. In this example, RULE 1 is chosen because it has the highest support value as a quality value. The process may continue to develop candidate rule set 440-2 by iteratively performing steps 330-350 until a corresponding one of the stopping parameters is met. Stage 400G of FIG. 4G reflects the process having iterated through the steps to create candidate rule set 440-2 that has a current scale size value 430-2 that satisfies the scale size requirement 445-2.

Figure 4H:
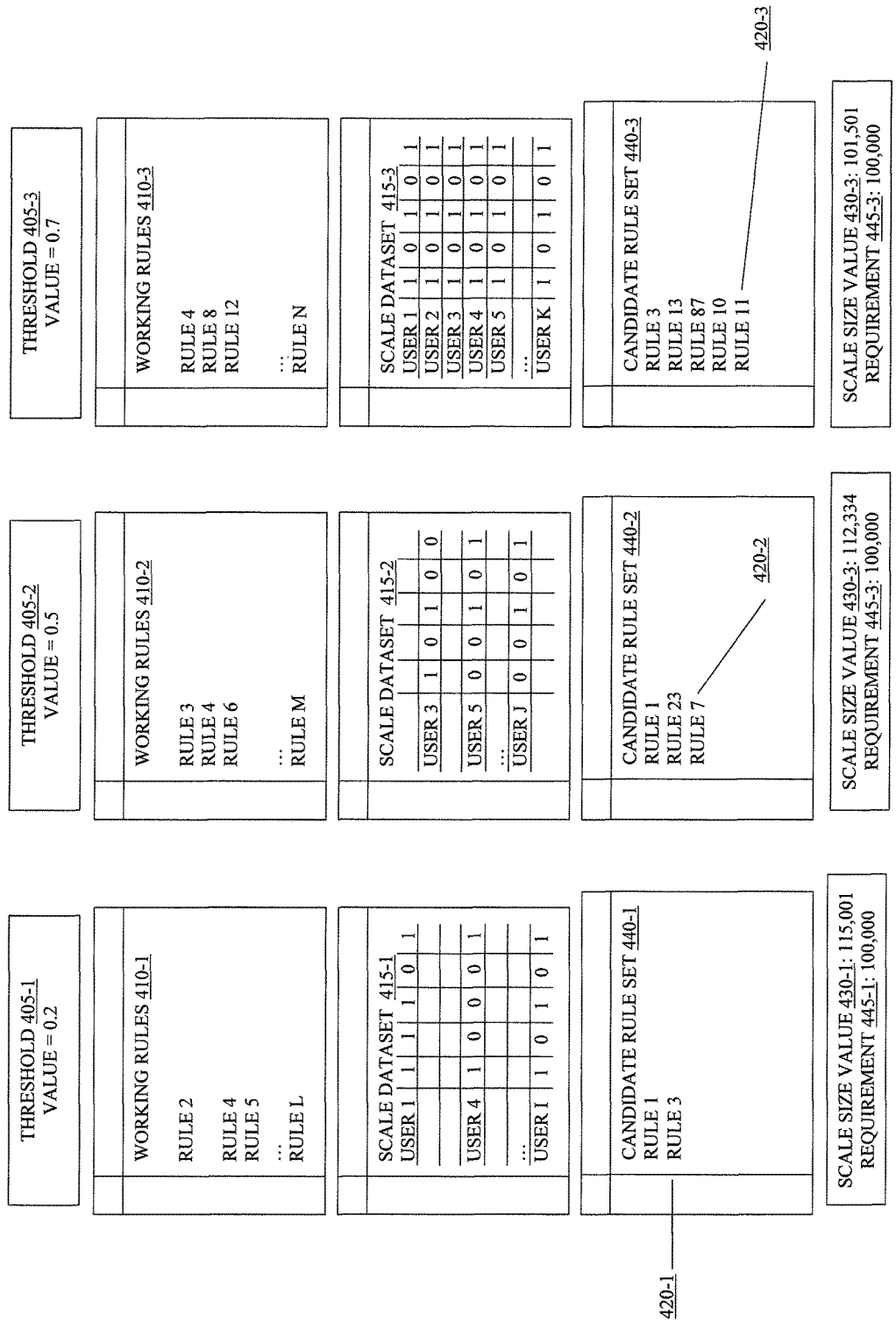

Stage 400H of FIG. 4H shows the resulting candidate rule sets after the process continues to iteratively perform steps 330-350 using minimum per-rule support threshold 405-3. Candidate rule sets 440-1, 440-2, and 440-3 may be evaluated using a dataset to produce metrics.

Figure 5:
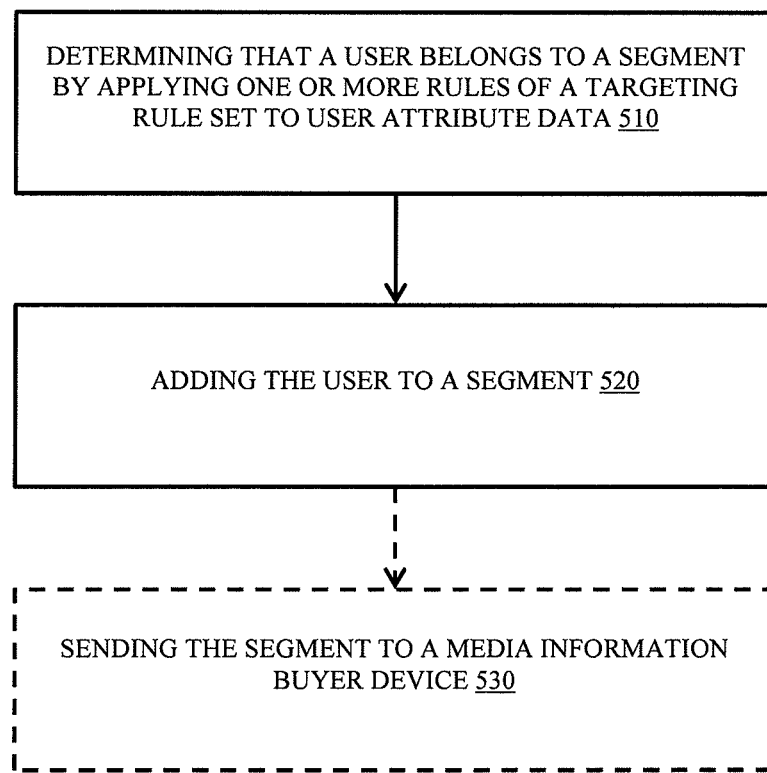
FIG. 5 depicts a block flow diagram of an exemplary method for applying a filtered rule set in accordance with one or more embodiments.

FIG. 5 depicts a block flow diagram of an exemplary method for applying a filtered rule set in accordance with one or more embodiments. In block 510, rule application module 165 may determine that a user belongs to a segment by applying one or more rules of the targeting rule set to user attribute data. The targeting rule set may have been created by a process comprising determining a plurality of association rules; determining a plurality of candidate rule sets based on the plurality of association rules; evaluating the plurality of candidate rule sets to produce metrics; and selecting the targeting rule set from the plurality of candidate rule sets based on the metrics. The process for creating the targeting rule set may be performed using any process for creating a rule set. In block 520, rule application module 165 may add the user to a segment. In block 530, a segment comprising one or more users may be sent to media information buyer device 105. In some embodiments, a only a user identifier may be sent to media information buyer device 105.

In some embodiments, combinations of association rules may be used to form a custom list of cookies to show advertising by receiving first party data from a provider via files, tags, or any combination thereof; constructing association rules using an association algorithm; selecting a subset of the association rules; placing the subset of the association rules in a platform; creating a segment using the platform; and selling the segment to the provider of the first party data. In some embodiments, selecting the subset of the association rules may further comprise (a) applying the association rules to an unlabeled data set to calculate a projected scale of each rule; (b) filtering one or more rules that have a scale above an initial threshold into a remaining rule set; (c) choosing a rule having a highest lift in the remaining rule set; (d) removing users that fall under the rule from a training set and from the unlabeled data set; (e) recalculating a lift value, a confidence value, a scale value, a support value, and a coverage value for rules in the remaining rule set; (f) repeating (c)-(e) until a goal projected segment size has been reached; and (g) repeating (b)-(f) while varying the initial threshold to choose an optimal threshold size, wherein the rule sets are validated using a validation set f-measure.

In some embodiments, the association rules may be used to form a custom list of users or a segment with any one or more of the embodiments disclosed in co-pending U.S. patent application Ser. No. 13/682,267 filed Nov. 20, 2012, entitled "MANAGING MODELED AUDIENCE EXTENSION INFORMATION,", which is hereby incorporated herein by reference.

Figure 6:
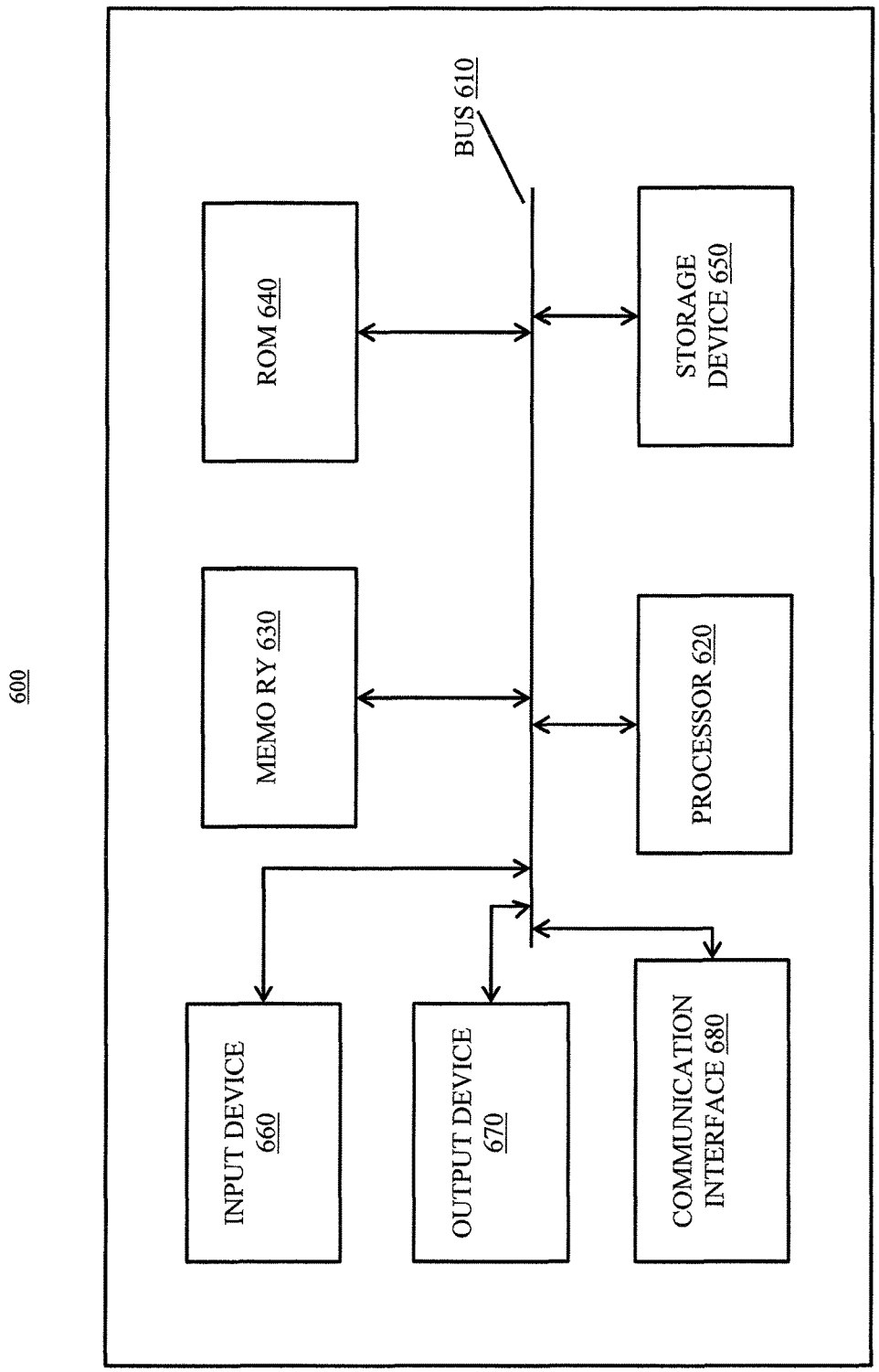
FIG. 6 depicts an exemplary architecture for implementing a computing device in accordance with one or more embodiments.

FIG. 6 depicts an exemplary architecture for implementing a computing device 600 in accordance with one or more embodiments, which may be used to implement any of market information buyer device 105, web server 110, user device 120, 150, server 180, data cloud 135, data warehouse 140, or any other computer system or computing device component thereof. It will be appreciated that other devices that can be used with the computing device 500, such as a client or a server, may be similarly configured. As illustrated in FIG. 6, computing device 600 may include a bus 610, a processor 620, a memory 630, a read only memory (ROM) 640, a storage device 650, an input device 660, an output device 670, and a communication interface 680.

Bus 610 may include one or more interconnects that permit communication among the components of computing device 600. Processor 620 may include any type of processor, microprocessor, or processing logic that may interpret and execute instructions (e.g., a field programmable gate array (FPGA)). Processor 620 may include a single device (e.g., a single core) and/or a group of devices (e.g., multi-core). Memory 630 may include a random access memory (RAM) or another type of dynamic storage device that may store information and instructions for execution by processor 620. Memory 630 may also be used to store temporary variables or other intermediate information during execution of instructions by processor 620.

ROM 640 may include a ROM device and/or another type of static storage device that may store static information and instructions for processor 620. Storage device 650 may include a magnetic disk and/or optical disk and its corresponding drive for storing information and/or instructions. Storage device 650 may include a single storage device or multiple storage devices, such as multiple storage devices operating in parallel. Moreover, storage device 650 may reside locally on the computing device 600 and/or may be remote with respect to a server and connected thereto via network and/or another type of connection, such as a dedicated link or channel.

Input device 660 may include any mechanism or combination of mechanisms that permit an operator to input information to computing device 600, such as a keyboard, a mouse, a touch sensitive display device, a microphone, a pen-based pointing device, and/or a biometric input device, such as a voice recognition device and/or a finger print scanning device. Output device 670 may include any mechanism or combination of mechanisms that outputs information to the operator, including a display, a printer, a speaker, etc.

Communication interface 680 may include any transceiver-like mechanism that enables computing device 600 to communicate with other devices and/or systems, such as a client, a server, a license manager, a vendor, etc. For example, communication interface 680 may include one or more interfaces, such as a first interface coupled to a network and/or a second interface coupled to a license manager. Alternatively, communication interface 680 may include other mechanisms (e.g., a wireless interface) for communicating via a network, such as a wireless network. In one implementation, communication interface 680 may include logic to send code to a destination device, such as a target device that can include general purpose hardware (e.g., a personal computer form factor), dedicated hardware (e.g., a digital signal processing (DSP) device adapted to execute a compiled version of a model or a part of a model), etc.

Computing device 600 may perform certain functions in response to processor 620 executing software instructions contained in a computer-readable medium, such as memory 630. In alternative embodiments, hardwired circuitry may be used in place of or in combination with software instructions to implement features consistent with principles of the invention. Thus, implementations consistent with principles of the invention are not limited to any specific combination of hardware circuitry and software.

Exemplary embodiments may be embodied in many different ways as a software component. For example, it may be a stand-alone software package, a combination of software packages, or it may be a software package incorporated as a "tool" in a larger software product. It may be downloadable from a network, for example, a website, as a stand-alone product or as an add-in package for installation in an existing software application. It may also be available as a client-server software application, or as a web-enabled software application. It may also be embodied as a software package installed on a hardware device.

Numerous specific details have been set forth to provide a thorough understanding of the embodiments. It will be understood, however, that the embodiments may be practiced without these specific details. In other instances, well-known operations, components and circuits have not been described in detail so as not to obscure the embodiments. It can be appreciated that the specific structural and functional details are representative and do not necessarily limit the scope of the embodiments.

It is worthy to note that any reference to "one embodiment" or "an embodiment" means that a particular feature, structure, or characteristic described in connection with the embodiment is included in at least one embodiment. The appearances of the phrase "in one embodiment" in the specification are not necessarily all referring to the same embodiment.

Although some embodiments may be illustrated and described as comprising exemplary functional components or modules performing various operations, it can be appreciated that such components or modules may be implemented by one or more hardware components, software components, and/or combination thereof. The functional components and/or modules may be implemented, for example, by logic (e.g., instructions, data, and/or code) to be executed by a logic device (e.g., processor). Such logic may be stored internally or externally to a logic device on one or more types of computer-readable storage media.

Some embodiments may comprise an article of manufacture. An article of manufacture may comprise a storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of storage media include hard drives, disk drives, solid state drives, and any other tangible storage media.

It also is to be appreciated that the described embodiments illustrate exemplary implementations, and that the functional components and/or modules may be implemented in various other ways which are consistent with the described embodiments. Furthermore, the operations performed by such components or modules may be combined and/or separated for a given implementation and may be performed by a greater number or fewer number of components or modules.

Some of the figures may include a flow diagram. Although such figures may include a particular logic flow, it can be appreciated that the logic flow merely provides an exemplary implementation of the general functionality. Further, the logic flow does not necessarily have to be executed in the order presented unless otherwise indicated. In addition, the logic flow may be implemented by a hardware element, a software element executed by a processor, or any combination thereof.

While various exemplary embodiments have been described above, it should be understood that they have been presented by way of example only, and not limitation. Thus, the breadth and scope of the present invention should not be limited by any of the above-described exemplary embodiments, but should instead be defined only in accordance with the following claims and their equivalents.

The invention claimed is:

1. A method for creating a targeting rule set of association rules, the method comprising:
   selecting, with a computer, a plurality of association rules;
   determining, with the computer, complexity parameters, a performance parameter, and a stopping parameter;
   selecting, with the computer, candidate rules from the plurality of association rules;
   calculating, with the computer, quality values of the candidate rules;
   removing, with the computer, an underperforming rule that does not meet the performance parameter from the candidate rules;
   iterating, with the computer, through the complexity parameters to generate a plurality of candidate rule sets until the stopping parameter is satisfied, wherein the complexity parameters correspond to a plurality of working rules of the candidate rules;
   evaluating, with the computer, the plurality of candidate rule sets to produce a metric; and
   assigning, with the computer, one of the plurality of candidate rule sets as the targeting rule set based on the metric.

2. The method of claim 1, wherein iterating through the complexity parameters to generate the plurality of candidate rule sets further includes:
   determining a first remaining rule from the plurality of working rules based on the quality values of the first remaining rule;
   adding the first remaining rule to the candidate rule set;
   removing the first remaining rule from the plurality of working rules;
   removing a transaction from a scale dataset and from a training dataset, wherein the transaction meets a support of the first remaining rule; and
   when the stopping parameter is not satisfied, recalculating conditional quality values for the scale dataset and the training dataset.

3. The method of claim 2, wherein the quality values include at least one of:
   a support of a rule from the plurality of working rules with respect to the scale dataset,
   a confidence of the rule from the plurality of working rules with respect to the scale dataset,
   a coverage of the rule from the plurality of working rules with respect to the scale dataset,
   a scale of the rule from the plurality of working rules with respect to the scale dataset,
   a lift of the rule from the plurality of working rules with respect to the scale dataset, and any combination thereof.

4. The method of claim 1, wherein the complexity parameters include a minimum per-rule support threshold.

5. A system for creating a targeting rule set of association rules, the system comprising:
   a memory; and
   a processor configured to:
      select a plurality of association rules;
      determine complexity parameters, a performance parameter, and a stopping parameter;
      select candidate rules from the plurality of association rules;
      calculate quality values of the candidate rules;
      remove an underperforming rule that does not meet the performance parameter from the candidate rules;
      iterate through the complexity parameters to generate a plurality of candidate rule sets until the stopping parameter is satisfied, wherein the complexity parameters correspond to a plurality of working rules of the candidate rules;
      evaluate the plurality of candidate rule sets to produce a metric; and
      assign one of the plurality of candidate rule sets as the targeting rule set based on the metric.

6. The system of claim 5, wherein the processor being configured to iterate through the complexity parameters to generate the plurality of candidate rule sets further includes the processor being configured to:
   determine a first remaining rule from the plurality of working rules based on the quality values of the first remaining rule;
   add the first remaining rule to the candidate rule set;
   remove the first remaining rule from the plurality of working rules;
   remove a transaction from a scale dataset and from a training dataset, wherein the transaction meets a support of the first remaining rule; and
   when the stopping parameter is not satisfied, recalculate conditional quality values for the scale dataset and the training dataset.

7. The system of claim 6, wherein the quality values include at least one of:
   a support of a rule from the plurality of working rules with respect to the scale dataset,
   a confidence of the rule from the plurality of working rules with respect to the scale dataset,
   a coverage of the rule from the plurality of working rules with respect to the scale dataset,
   a scale of the rule from the plurality of working rules with respect to the scale dataset,
   a lift of the rule from the plurality of working rules with respect to the scale dataset, and any combination thereof.

8. The system of claim 7, wherein the complexity parameters include a minimum per-rule support threshold.

9. A computer readable storage medium for creating a targeting rule set of association rules, the computer readable storage medium comprising instructions that if executed enable a computing system to:
   select a plurality of association rules;
   determine complexity parameters, a performance parameter, and a stopping parameter;
   select candidate rules from the plurality of association rules;
   calculate quality values of the candidate rules;
   remove an underperforming rule that does not meet the performance parameter from the candidate rules;
   iterate through the complexity parameters to generate a plurality of candidate rule sets until the stopping parameter is satisfied, wherein the complexity parameters correspond to a plurality of working rules of the candidate rules;
   evaluate the plurality of candidate rule sets to produce a metric; and
   assign one of the plurality of candidate rule sets as the targeting rule set based on the metric.

10. The computer readable storage medium of claim 9, wherein the instructions for iterating through the complexity parameters to generate the plurality of candidate rule sets further includes instructions that if executed enable the computing system to:
    determine a first remaining rule from the plurality of working rules based on the quality values of the first remaining rule;

add the first remaining rule to the candidate rule set;
remove the first remaining rule from the plurality of working rules;
remove a transaction from a scale dataset and from a training dataset, wherein the transaction meets a support of the first remaining rule; and
when the stopping parameter is not satisfied, recalculate conditional quality values for the scale dataset and the training dataset.

11. The computer readable storage medium of claim 10, wherein the quality values include at least one of:
   a support of a rule from the plurality of working rules with respect to the scale dataset,
   a confidence of the rule from the plurality of working rules with respect to the scale dataset,
   a coverage of the rule from the plurality of working rules with respect to the scale dataset,
   a scale of the rule from the plurality of working rules with respect to the scale dataset,
   a lift of the rule from the plurality of working rules with respect to the scale dataset, and any combination thereof.

12. The computer readable storage medium of claim 9, wherein the complexity parameters include a minimum per-rule support threshold.

13. A method for using combinations of association rules to form a custom list of cookies to show advertising, the method comprising:
   receiving first party data from a provider via files, tags, or any combination thereof;
   constructing association rules using an association algorithm;
   applying the association rules to an unlabeled data set to calculate a projected scale of each rule;
   (a) filtering rules that have a scale above an initial threshold into a remaining rule set;
   (b) choosing a rule having a highest lift in the remaining rule set;
   (c) removing users that fall under the rule from a training set and from the unlabeled data set;
   (d) recalculating a lift value, a confidence value, a scale value, a support value, and a coverage value for rules in the remaining rule set;
   (e) repeating (b)-(d) until a goal projected segment size has been reached;
   repeating (a)-(e) while varying the initial threshold to choose an optimal threshold size, wherein the rule sets are validated using a validation set f-measure;
   selecting a subset of the association rules based on the application of the association rules to the unlabeled data set;
   placing the subset of the association rules in a platform;
   creating a segment using the platform; and
   selling the segment to the provider of the first party data.

14. A system for using combinations of association rules to form a custom list of cookies to show advertising, the system comprising:
   a memory; and
   a processor configured to:
      receive first party data from a provider via files, tags, or any combination thereof;
      construct association rules using an association algorithm;
      apply the association rules to an unlabeled data set to calculate a projected scale of each rule;
      (a) filter rules that have a scale above an initial threshold into a remaining rule set;
      (b) choose a rule having a highest lift in the remaining rule set;
      (c) remove users that fall under the rule from a training set and from the unlabeled data set;
      (d) recalculate a lift value, a confidence value, a scale value, a support value, and a coverage value for rules in the remaining rule set;
      (e) repeat (b)-(d) until a goal projected segment size has been reached;
      repeat (a)-(e) while varying the initial threshold to choose an optimal threshold size, wherein the rule sets are validated using a validation set f-measure;
      select a subset of the association rules based on the application of the association rules to the unlabeled data set;
      place the subset of the association rules in a platform;
      create a segment using the platform; and
      sell the segment to the provider of the first party data.

15. A computer readable medium for using combinations of association rules to form a custom list of cookies to show advertising, the computer readable medium comprising instructions that if executed enable a computing system to:
   receive first party data from a provider via files, tags, or any combination thereof;
   construct association rules using an association algorithm;
   apply the association rules to an unlabeled data set to calculate a projected scale of each rule;
   (a) filter rules that have a scale above an initial threshold into a remaining rule set;
   (b) choose a rule having a highest lift in the remaining rule set;
   (c) remove users that fall under the rule from a training set and from the unlabeled data set;
   (d) recalculate a lift value, a confidence value, a scale value, a support value, and a coverage value for rules in the remaining rule set;
   (e) repeat (b)-(d) until a goal projected segment size has been reached;
   repeat (a)-(e) while varying the initial threshold to choose an optimal threshold size, wherein the rule sets are validated using a validation set f-measure;
   select a subset of the association rules based on the application of the association rules to the unlabeled data set;
   place the subset of the association rules in a platform;
   create a segment using the platform; and
   sell the segment to the provider of the first party data.

* * * * *